Patented Feb. 6, 1940

2,189,723

UNITED STATES PATENT OFFICE 2,189,723

HYDROGEN ESTER SALTS OF GLUCOSIDES AND PROCESS FOR PREPARING THE SAME

Max Bockmühl and Gustav Ehrhart, Frankfort-on-the-Main, Germany, assignors to Winthrop Chemical Company, Inc., New York, N. Y., a corporation of New York No Drawing. Application June 27, 1936, Serial No. 87,801. Renewed June 17, 1939. In Germany July 3, 1935

8 Claims. (Cl. 260—210)

The present invention relates to a process for preparing hydrogen ester salts being readily soluble in water of the glucosides having an action on the heart.

As is known, the cardiac glucosides are of low solubility in water; this prevents their unlimited application.

We have now found that compounds readily soluble in water may be obtained by converting the cardiac glucosides into derivatives which are salts of acid esters. These compounds have the additional advantage that they are excellently tolerated. The new compounds are made by causing halides, oxyhalides, ester halides or ester anhydrides of organic or inorganic acids especially phosphorus oxychloride and phosphorus trichloride, if desired, in the presence of acid binding substances such as pyridine or dimethylaniline, to react with glucosides and by transforming the products of reaction into salts.

The following examples serve to illustrate our invention, but they are not intended to limit it thereto:

(1) 0.65 gram of digitoxine is dissolved in 10 cc. of dry pyridine and, while cooling, 0.2 gram of phosphorus oxychloride, dissolved in 5 cc. of dry pyridine, is added and the whole is allowed to stand for 6 to 7 hours. The solution is then diluted with ice water, a solution of 0.33 gram of crystallized sodium acetate in water is added and the mixture is evaporated to dryness under reduced pressure at a temperature not exceeding 50° C. The solid residue is first triturated with ether and filtered with suction. By recrystallizing the solid from alcohol there is obtained the sodium salt of digitoxinediphosphoric ester.

(2) 1 gram of G-strophantine (ouabain) is dissolved in 10 cc. of dry pyridine and 0.29 gram of phosphorus oxychloride, dissolved in 5 cc. of dry pyridine, is added. The whole is worked up as described in Example 1 and yields the sodium salt of G-strophantinephosphoric ester.

(3) 1 gram of oleandrine is dissolved in 10 cc. of pyridine and 0.27 gram of phosphorus oxychloride, dissolved in 5 cc. of pyridine, is added, while cooling. The whole is allowed to stand for some hours, first while cooling, then at room temperature; ice and a solution of 1.25 grams of crystallized sodium acetate in 15 cc. of water are then added and the whole is brought to dryness under reduced pressure and at a low temperature. The residue is dissolved in water and the solution is acidified with dilute hydrochloric acid. The acid which separates at once is filtered with suction, washed with water and then suspended in a small amount of water and neutralized with a caustic soda solution. The clear solution is evaporated to dryness under reduced pressure, and the residue is mixed with alcohol, filtered with suction and washed with alcohol and ether. The analysis yields a phosphorus content of 4.30 per cent. strength.

We claim:

1. The process which comprises causing phosphorus oxychloride to act upon digitoxine.

2. The process which comprises causing phosphorus oxychloride to act upon G-strophantine.

3. The process which comprises causing phosphorus oxychloride to act upon oleandrine.

4. The products obtainable by causing phosphorus oxychloride to act upon digitoxine, said products being white substances readily soluble in water.

5. The products obtainable by causing phosphorus oxychloride to act upon G-strophantine, said products being white substances readily soluble in water.

6. The products obtainable by causing phosphorus oxychloride to act upon oleandrine, said products being white substances readily soluble in water.

7. The process which comprises causing a compound of the group consisting of phosphorus oxychloride and phosphorus trichloride to act upon a glucoside having an action on the heart.

8. The products obtainable by causing a compound of the group consisting of phosphorous oxychloride and phosphorus trichloride to act upon a glucoside having an action on the heart, said products being white substances readily soluble in water.

MAX BOCKMÜHL.
GUSTAV EHRHART.